United States Patent
Hernandez Covarrubias et al.

(10) Patent No.: US 10,160,381 B1
(45) Date of Patent: Dec. 25, 2018

(54) VEHICLE CARGO CANOPY WITH HAZARD WARNING SIGN

(71) Applicant: GM GLOBAL TECHNOLOGY OPERATIONS LLC, Detroit, MI (US)

(72) Inventors: Alejandro Hernandez Covarrubias, San Mateo (MX); Elida Yazmin Gasca Fuentes, Toluca (MX)

(*) Notice: Subject to any disclaimer, the term of this patent is extended or adjusted under 35 U.S.C. 154(b) by 0 days.

(21) Appl. No.: 15/675,201

(22) Filed: Aug. 11, 2017

(51) Int. Cl.
| | | |
|---|---|---|
| B60Q 7/00 | (2006.01) | |
| E01F 9/646 | (2016.01) | |
| B60Q 1/52 | (2006.01) | |
| B60Q 1/30 | (2006.01) | |
| B60Q 1/00 | (2006.01) | |

(52) U.S. Cl.
CPC ........... B60Q 7/005 (2013.01); B60Q 1/0035 (2013.01); B60Q 1/30 (2013.01); B60Q 1/52 (2013.01); E01F 9/646 (2016.02)

(58) Field of Classification Search
CPC ........ B60Q 7/005; B60Q 1/0035; B60Q 1/30; B60Q 1/52; E01F 9/646; B60R 7/00
USPC ...... 116/63 R, 63 P, 63 T, 28 R; 40/610, 612
See application file for complete search history.

(56) References Cited

U.S. PATENT DOCUMENTS

| | | | | |
|---|---|---|---|---|
| 2,898,146 A | * | 8/1959 | Yudenfreund | B60R 13/01 296/39.1 |
| 3,082,033 A | * | 3/1963 | Bosher | B60R 5/042 16/221 |
| 3,113,552 A | | 12/1963 | Spooncer | |
| 3,255,725 A | * | 6/1966 | Von Kreidner | B60Q 7/02 116/173 |
| 3,291,520 A | * | 12/1966 | Smith | B60J 5/103 296/24.44 |
| 3,322,093 A | * | 5/1967 | Goland | B32B 27/00 116/63 P |
| 3,430,374 A | * | 3/1969 | Woodard | B60Q 7/005 40/514 |
| 3,471,958 A | * | 10/1969 | Westin | G09F 21/04 40/124.15 |
| 3,590,506 A | * | 7/1971 | Jeski | B60Q 7/005 116/28 R |
| 3,594,938 A | * | 7/1971 | Mosch | B60Q 7/005 40/591 |
| 3,936,967 A | | 2/1976 | Davis | |
| 3,949,503 A | * | 4/1976 | Waress | B60Q 7/005 40/591 |

(Continued)

*Primary Examiner* — R. A. Smith
*Assistant Examiner* — Tania Courson

(57) ABSTRACT

A cover assembly including: first, second, and third substantially rectangular panel sections in a parallel relationship and the second panel being interposed between the first and third panels. The foldable cover assembly also includes the first, second, and third panels being pivotally connected such that the panels can fold in relation to one another so as to form the cover assembly into a triangular configuration or the panels can fold open to bring the panels to have a common plane. The foldable cover assembly also includes a fastening device for temporarily holding the cover assembly in the triangular configuration. The foldable cover assembly also includes where at least one of the panels having established thereon a hazard sign for signaling distress in situations involving motor vehicle traffic; and where the hazard sign can be directed towards the surrounding environment when the cover assembly is in the triangular configuration.

20 Claims, 4 Drawing Sheets

(56) References Cited

U.S. PATENT DOCUMENTS

| | | | | |
|---|---|---|---|---|
| 4,178,874 A * | 12/1979 | Berns | G09F 21/04 | 116/28 R |
| 4,182,063 A * | 1/1980 | Klosel | B60Q 7/005 | 116/63 P |
| 4,351,555 A * | 9/1982 | Hashimoto | B60R 5/044 | 16/366 |
| 4,374,376 A * | 2/1983 | Pillifant, Jr. | B60Q 7/00 | 116/28 R |
| 4,443,034 A * | 4/1984 | Beggs | B60N 2/3011 | 296/65.17 |
| 4,607,444 A * | 8/1986 | Foster | G09F 13/28 | 116/28 R |
| 4,708,388 A * | 11/1987 | Zacharczuk | B60J 1/2091 | 116/28 R |
| 4,776,625 A * | 10/1988 | Lobanoff | B60R 5/045 | 296/37.16 |
| 4,821,668 A * | 4/1989 | Leschke | B60Q 7/005 | 116/209 |
| 4,919,259 A * | 4/1990 | Beaulieu | A45C 7/0054 | 16/225 |
| 5,322,335 A * | 6/1994 | Niemi | B60N 2/6009 | 296/39.1 |
| 5,427,428 A * | 6/1995 | Ericson | B60J 7/141 | 160/231.1 |
| 5,441,183 A * | 8/1995 | Frenzel | B60R 7/02 | 224/542 |
| 5,570,921 A * | 11/1996 | Brooker | B60R 5/04 | 224/542 |
| 5,716,091 A * | 2/1998 | Wieczorek | B60R 5/04 | 224/275 |
| 6,186,575 B1 * | 2/2001 | Fisher | B62D 47/003 | 296/100.02 |
| 6,439,633 B2 * | 8/2002 | Nemoto | B60P 7/0876 | 296/37.14 |
| 6,508,499 B1 * | 1/2003 | Guanzon | B60R 5/04 | 296/37.1 |
| 6,527,330 B1 * | 3/2003 | Steffens | B60J 7/141 | 296/100.02 |
| 6,561,560 B2 * | 5/2003 | Brown | B60P 3/40 | 296/26.11 |
| 6,986,541 B1 * | 1/2006 | Haack | B62D 33/02 | 224/404 |
| 7,226,100 B1 * | 6/2007 | Willey | B62D 33/03 | 296/26.11 |
| 7,404,372 B2 * | 7/2008 | Aasgaard | B60Q 7/00 | 116/28 R |
| 7,938,301 B2 * | 5/2011 | Aurbeck | B62D 25/18 | 116/50 |
| 8,186,736 B2 * | 5/2012 | Jouraku | B60R 5/04 | 16/72 |
| 8,376,446 B2 * | 2/2013 | Golden | B60J 7/041 | 296/100.01 |
| 8,834,985 B2 * | 9/2014 | Preisler | B32B 3/263 | 296/39.1 |
| 2002/0021019 A1 * | 2/2002 | Bohm | B60J 7/041 | 296/100.02 |
| 2004/0128888 A1 * | 7/2004 | Payan | G09F 15/0062 | 40/610 |
| 2006/0138183 A1 * | 6/2006 | Hein | B60R 7/06 | 224/282 |
| 2015/0275446 A1 * | 10/2015 | Rust | E01F 13/022 | 256/26 |

* cited by examiner

VEHICLE CARGO CANOPY WITH HAZARD WARNING SIGN

INTRODUCTION

Many of the sport utility vehicles (SUVs) and pickup trucks sold today have a cargo cover (also known as a tonneau cover) to cover cargo space in the rear of the vehicle or its bed. These cargo covers are typically made as multi-piece foldable panels of a relatively strong and rigid material to comply with predetermined strength and performance specifications. They are usually flat with a black or grey grained surface in order to prevent or hide any dents, dings, or scratches which may occur when the covers are folded together to open the cargo compartment. When needed, these covers may also be temporarily detached and removed from the vehicle interior or bed.

Furthermore, as is known, portable warning signs are convenient to communicate a message that warns of a hazard to nearby motorists and/or pedestrians. For example, these warning signs may be used to warn motorists of roadside emergencies such as flat tires and accidents. However, vehicle owners tend to forget to store any warning devices within their vehicle and are often without help during such emergencies. It is therefore desirable to include a warning sign on a vehicle's cargo cover since such covers are less forgotten and more likely to be accessible during a roadside emergency situation.

SUMMARY

A foldable cover assembly for selectively covering a vehicle cargo area is herein presented. In one general aspect, the cover assembly including: first, second, and third substantially rectangular panel sections in a parallel relationship and the second panel section being interposed between the first and third panel sections. The foldable cover assembly also includes the first, second, and third panel sections being pivotally connected such that the panel sections can fold in relation to one another so as to form the cover assembly into a configuration having a substantially triangular cross section or the panel sections can fold open to bring the first, second, and third panel sections to have a common plane. The foldable cover assembly also includes a fastening device for temporarily holding the cover assembly in the configuration having the substantially triangular cross section. The foldable cover assembly also includes where at least one of the panel sections having established thereon a hazard sign for signaling distress in situations involving motor vehicle traffic; and where the hazard sign can be directed towards the surrounding environment when the cover assembly is in the configuration having the substantially triangular cross section.

Implementations may include one or more of the following features. The vehicle cargo area being generally formed behind a rear seat and between spaced interior sidewalls of a vehicle. The first and third panel sections include a plurality of adapters for releasably connecting to the interior sidewalls so as to enable the cover assembly to selectively cover the vehicle cargo area, when the first, second, and third panel sections have a common plane. The flexible living hinges connect the adjacent panel sections and each living hinge extends along the entire width of the adjacent panel sections. The living hinges pivot, respectively, in opposite directions. The first, second, and third panel sections are constructed from a rigid material. Where at least one panel section includes a plurality of protuberances for placing the cover assembly on a surface, when the cover assembly is in the configuration having the substantially triangular cross section. The third panel section moreover includes the plurality of protuberances. The first and second panel sections having established thereon the hazard sign. The hazard sign is moreover constructed from reflective material configured to enhance visibility to the surrounding environment.

A foldable cover assembly for selectively covering a vehicle cargo area is also herein presented. Where the vehicle cargo area being generally formed behind a rear seat and between spaced interior sidewalls of the vehicle. One general aspect includes the cover assembly including: first, second, and third rigid substantially rectangular panel sections in a parallel relationship and the second panel section being interposed between the first and third panel sections. The foldable cover assembly also includes the first, second, and third panel sections being pivotally connected such that the panel sections can fold in relation to one another so as to form the cover assembly into a configuration having a substantially triangular cross section or the panel sections can fold open to bring the first, second, and third panel sections to have a common plane. The foldable cover assembly also includes flexible living hinges connected to the adjacent panel sections and each living hinge extends along the entire width of the adjacent panel sections, the living hinges pivot, respectively, in opposite directions. The foldable cover assembly also includes a fastening device for temporarily holding the cover assembly in the configuration having the substantially triangular cross section. The foldable cover assembly also includes a plurality of protuberances located on the third panel section, the protuberances for placing the cover assembly on a surface when the cover assembly is in the configuration having the substantially triangular cross section. The foldable cover assembly also includes where the first and second panel sections having imprinted thereon a reflective hazard sign for signaling distress in situations involving motor vehicle traffic; and where both hazard signs are directed towards the surrounding environment when the cover assembly is in the configuration having the substantially triangular cross section.

Implementations may include one or more of the following features. The cover assembly where the first and third panel sections include a plurality of adapters for releasably connecting to the interior sidewalls so as to enable the cover assembly to selectively cover the vehicle cargo area, when the first, second, and third panel sections have a common plane.

A method of signaling distress in situations involving motor vehicle traffic is further presented herein. One general aspect includes the method including: retrieving a foldable cover assembly for selectively covering a vehicle cargo area. As discussed above, the cover assembly includes: first, second, and third substantially rectangular panel sections in a parallel relationship and the second panel section being interposed between the first and third panel sections; the first, second, and third panel sections being pivotally connected such that the panel sections can fold in relation to one another so as to form the cover assembly into a configuration having a substantially triangular cross section or the panel sections can fold open to bring the first, second, and third panel sections to have a common plane; a fastening device for temporarily holding the cover assembly in the configuration having the substantially triangular cross section; where at least one of the panel sections having established thereon a hazard sign for signaling distress in situations involving motor vehicle traffic; where the hazard sign can be directed towards the surrounding environment when the cover assembly is in the configuration having the substantially triangular cross section. In a second step: folding the first, second, and third panel sections in relation to one another so as to form the cover assembly into a configuration having a substantially triangular cross section. In a third step, permitting the cover assembly, when in the configuration having the substantially triangular cross section, to be placed at a location visible to motor vehicle traffic. In a fourth step, permitting the hazard sign to be directed towards the motor vehicle traffic so as to signal distress.

Implementations may include one or more of the following features. The method further including removing the cover assembly from the vehicle interior, when the first, second, and third panel sections have a common plane and the cover assembly selectively covers the vehicle cargo area. The method where the vehicle cargo area is generally formed behind a rear seat and between spaced interior sidewalls of a vehicle. The method where flexible living hinges connect the adjacent panel sections and each living hinge extends along the entire width of the adjacent panel sections. The method where the living hinges pivot, respectively, in opposite directions. The method where the first, second, and third panel sections are constructed from a rigid material. The method where the first and second panel sections having established thereon the hazard sign. The method where the hazard sign is constructed from reflective material configured to enhance visibility to the surrounding environment.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
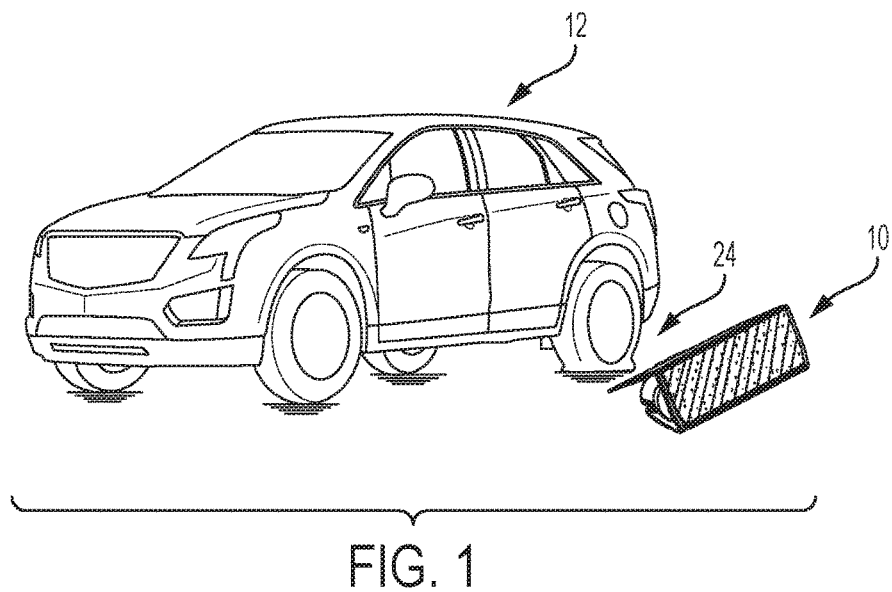
FIG. 1 shows an environmental view of an exemplary cover assembly according to one aspect of the present disclosure.
Figure 2:
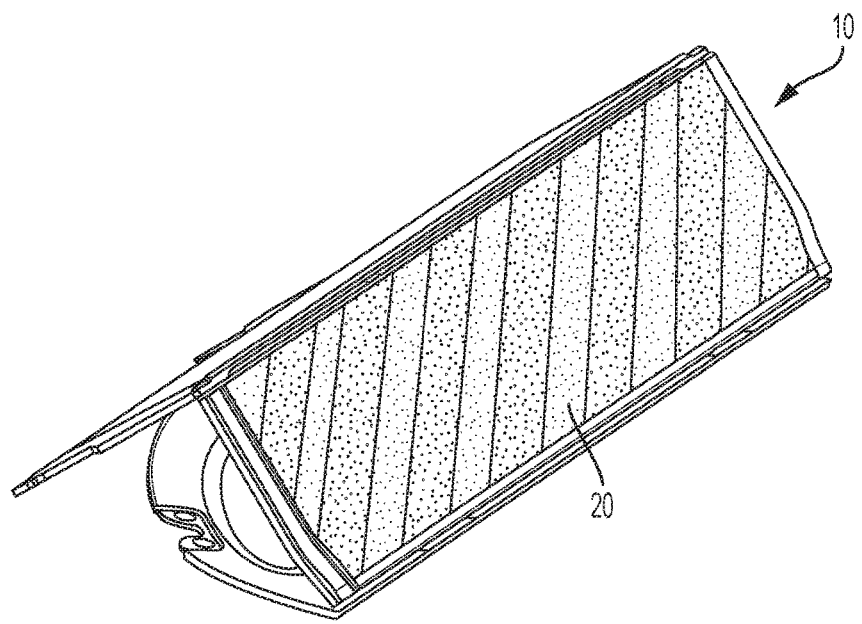
FIG. 2 shows a perspective view of an exemplary cover assembly according to one aspect of the present disclosure.
Figure 3:
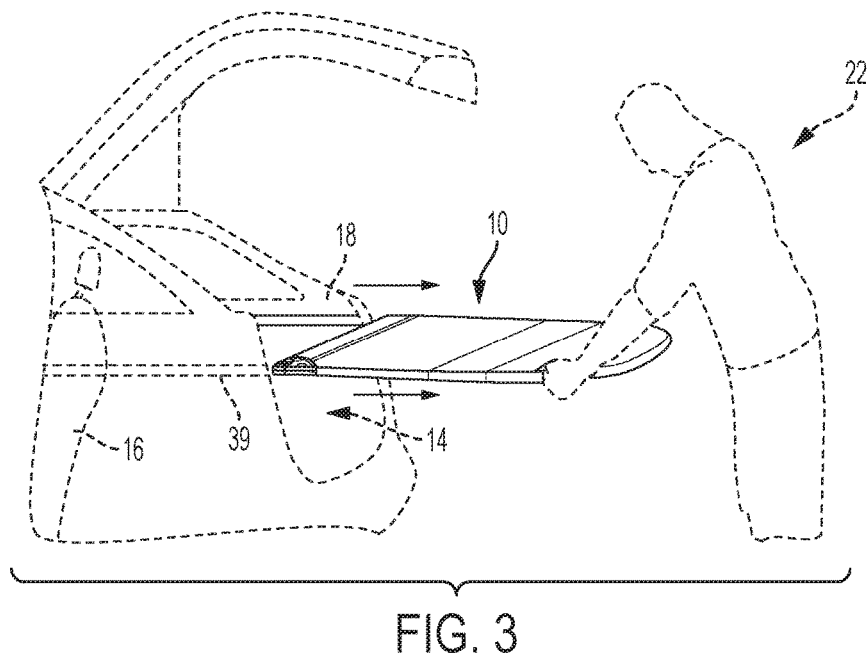
FIG. 3 shows an environmental view of the cover assembly of FIG. 2 according to another aspect of the present disclosure.
Figure 4A:
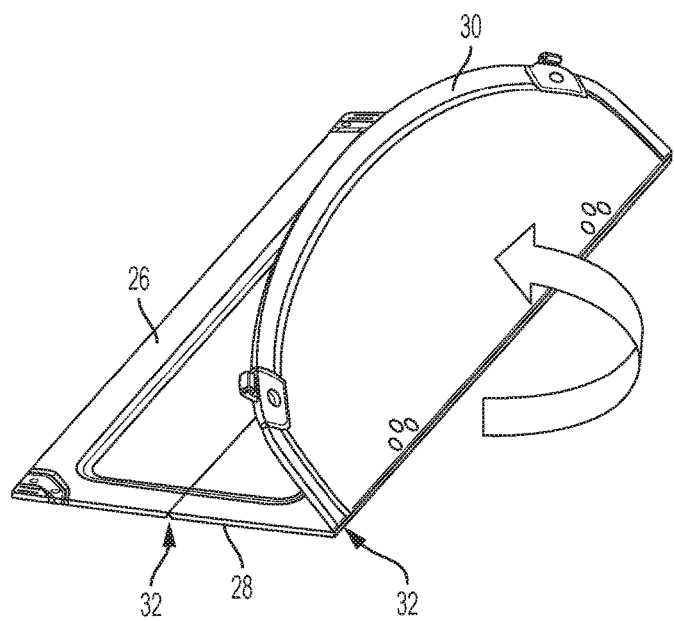
FIG. 4A shows a perspective view of the cover assembly of FIG. 2 according to another aspect of the present disclosure.
Figure 4B:
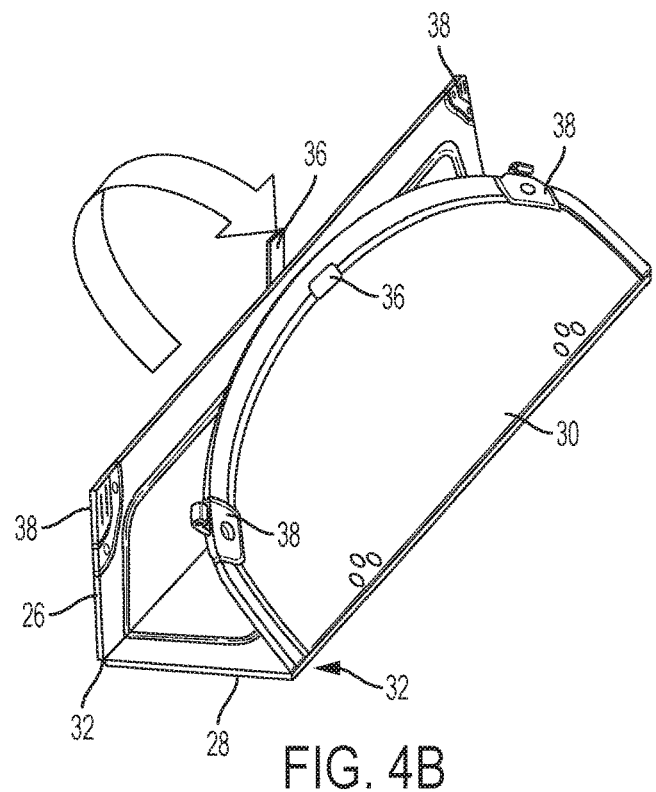
FIG. 4B shows a perspective view of the cover assembly of FIG. 2 according to another aspect of the present disclosure.
Figure 5:
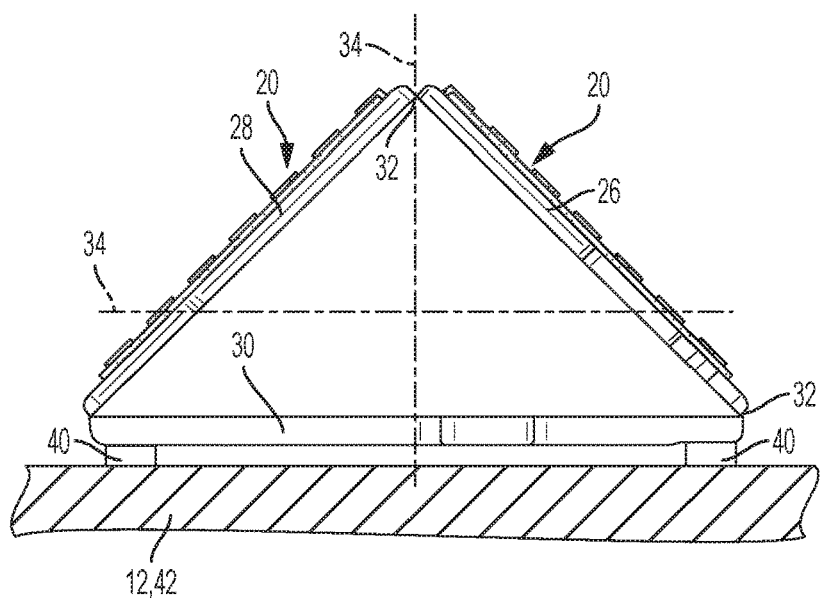
FIG. 5 shows a side view of the cover assembly of FIG. 2 according to another aspect of the present disclosure.
Figure 6:
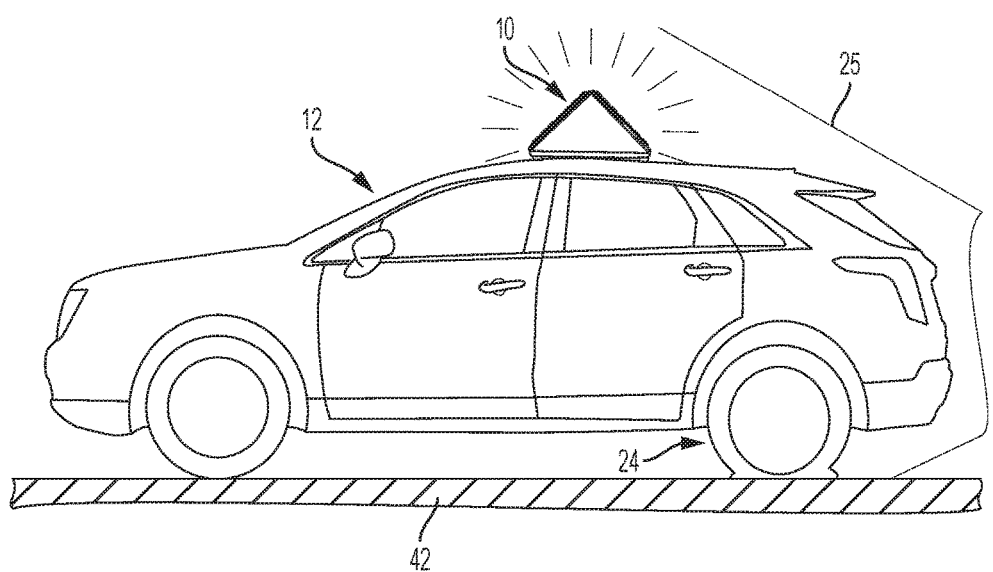
FIG. 6 shows an environmental view of the cover assembly of FIG. 2 according to another aspect of the present disclosure.

As shown in FIGS. 1 through 3, a foldable cover assembly incorporating a hazard sign has generally been indicated by reference numeral 10. Under normal circumstances, cover assembly 10 is adapted to cover the cargo area of a vehicle 12 in a selected manner and may otherwise be known as, for example, a "cargo cover" or "tonneau cover." Cover assembly 10 may cover selected portions of the cargo area 14 of vehicles such as, for example, Sport Utility Vehicles (SUV) and Pickup Trucks (e.g., the bed). When installed in an SUV, the cover assembly 10 is formed behind the vehicle's rear passenger seat 16, between spaced interior sidewalls 18 (see FIG. 3). Under emergency situations, however, cover assembly 10 can be detached, pulled out, removed from cargo area 14, and folded to expose a hazard sign 20 that can assist with signaling distress in situations involving motor vehicle traffic. For example, a vehicle operator 22 may fold cover assembly 10 to show hazard sign 20 when vehicle 12 is rendered immobile due to a flat tire 24. In such an example, operator 22 would direct hazard sign 20 towards oncoming traffic in the environment surrounding vehicle 12 to help reduce risk of exacerbating the emergency (e.g., by vehicle 12 or operator 22 being accidentally hit by oncoming traffic).

As shown in FIGS. 4A through 6, cover assembly 10 itself includes three distinct panel sections—a first panel section 26, a second panel section 28, and a third panel section 30. Wherein the first panel 26 is adjacent to second panel 28 and the second panel 28 is adjacent to the third panel 30. As such, second panel 28 is situated between the first and third panel 26, 30. In addition, these panels 26, 28, 30 are connected to each other, respectively, in a parallel relationship and may be manufactured from rigid material such as, but not limited to, plastic, metal, or fiberglass. These panels 26, 28, 30 also have a substantially rectangular shape, where first and second panels 26, 28 are rectangular in nature and the third panel 30 is a rectangle with an external side having a bow-shaped curve.

Living hinges 32, which extend along the width of cover assembly 10, pivotally connect the adjacent panels 26, 28, 30 (i.e., between the first and second panels as well as the second and third panels). Furthermore, the living hinges 32 pivot, respectively, in opposite directions. This allows the first panel 26 and third panel 30 to both fold towards second panel 28. As such, the panels 26, 28, 30 can fold in relation to one another to form cover assembly 10 into a configuration with a triangular cross-section 34 (see FIG. 5). A fastening device 36, such as, but not limited to, a VELCO strip and adhesion strip or latch can be used to hold cover assembly 10 into the triangular configuration 34. This triangular configuration 34 is therefore the configuration an operator 22 would want to use when signaling distress in those emergency situations involving motor vehicle traffic.

First panel 26 and third panel 30 may alternatively fold away from second panel 28 to form cover assembly 10 in which the panels 26, 28, 30 have a common plane (see FIG. 3). This flat configuration allows an operator 22 to releasably install cover assembly 10 to a pair of rails/ledges 39 on the sidewalls of cargo area 14 and therefore allow covering of part or all of this space. The first and third panels 26, 30 may also include adapters 38 that enable the releasable connection of cover assembly 10 to these rails/ledges 39. For example, the adapters 38 on the first panel 26 may be configured to slide into and interlock with a flange on each rail/ledge 39 and the adapters 38 on the third panel 30 may clip into a notch/indent on each rail/ledge 39.

A hazard sign 20 is imprinted on the first and second panels 26, 28. Each sign 20 may also be printed on the side of the panel that is exposed to the surrounding environment when cover assembly 10 has a triangular configuration 34. This allows each sign 20 to be directed outward and towards traffic. Furthermore, each sign 20 may be constructed from brightly colored reflective material to enhance visibility when the light 25 from automobile traffic headlamps hits the sign's body. As can be seen in FIG. 1, the hazard sign 20 may have numerous diagonal strips with an inverse color pattern scheme. For example certain strips may be red while their adjacent strips may be yellow. Skilled artisans, however, will see that sign 20 may have other sign patterns and may further include text (e.g., "STOP", "HAZARD", "EMERGENCY", etc.). Skilled artisans will also see that either/both hazard signs 20 can be painted onto the panels 26, 28 or may be affixed to these panels via adhesives or joining mechanisms (e.g., screws, tacks, nails, etc.).

The third panel 30 may include a number of protuberances 40 such as, but not limited to, rubber nubs. The protuberances 40 allow the secure placement of the folded cover assembly on surfaces such as pavement 42 or on top of vehicle 12 (see FIG. 6), by creating friction that keeps cover assembly 10 at its intended location. The protuberances 40 may also be releasably fastened to the third panel 30 via fasteners such as, but not limited to, screws, tacks, and bolts.

To use cover assembly 10 to signal distress during those situations involving motor vehicle traffic, the operator 22 is first required to retrieve the assembly 10 from the vehicle cargo area 14. For example, operator 22 must detach assembly 10 from rails/ledges 39 and slide the flatly configured assembly 10 from vehicle 12. Operator 22 is then required to fold the panels 26, 28, 30 in relation to each other to form the assembly 10 into the triangular configuration. Operator 22 then places the folded cover assembly 10 on pavement 42 near the flat tire 24 (FIG. 1) or on top of vehicle 12 (FIG. 6), so that the signs 20 are visible to nearby traffic. Finally, the distressed operator 22 adjusts assembly 10 to ensure signs 20 are sufficiently directed towards traffic to ensure they can be seen and signal distress.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A foldable cover assembly for selectively covering a vehicle cargo area within a Sports Utility Vehicle (SUV), the cover assembly comprising:
   first, second, and third substantially rectangular panel sections in a parallel relationship and the second panel section being interposed between the first and third panel sections;
   the first, second, and third panel sections being pivotally connected such that the panel sections can fold in relation to one another so as to form the cover assembly into a configuration having a substantially triangular cross section or the panel sections can fold open to bring the first, second, and third panel sections to have a common plane;
   a fastening device for temporarily holding the cover assembly in the configuration having the substantially triangular cross section;
   wherein at least one of the panel sections having established thereon a hazard sign for signaling distress in situations involving motor vehicle traffic;
   wherein the hazard sign can be directed towards the surrounding environment when the cover assembly is in the configuration having the substantially triangular cross section; and
   wherein the vehicle cargo area is at a location behind a rear seat and between spaced interior sidewalls and under a roof of the SUV.

2. The cover assembly of claim 1, wherein the first and third panel sections comprise a plurality of adapters for releasably connecting to rails or ledges on the interior sidewalls so as to enable the cover assembly to selectively cover the vehicle cargo area, when the first, second, and third panel sections have a common plane, wherein the adapters on the first panel are configured to slide into and interlock with a flange on each rail or ledge and the adapters on the third panel are configured to clip into a notch or indent on each rail or ledge.

3. The cover assembly of claim 1, wherein flexible living hinges connect the adjacent panel sections and each living hinge extends along the entire width of the adjacent panel sections.

4. The cover assembly of claim 3, wherein the living hinges pivot, respectively, in opposite directions.

5. The cover assembly of claim 1, wherein the first, second, and third panel sections are constructed from a rigid material.

6. The cover assembly of claim 1, wherein at least one panel section comprises a plurality of rubber nubs for placing the cover assembly on a ground surface when the cover assembly is in the configuration having the substantially triangular cross section.

7. The cover assembly of claim 1, wherein the third panel section comprises the plurality of releasably fastened rubber nubs, wherein the rubber nubs are releasably fastened via screws, tacks, or bolts.

8. The cover assembly of claim 1, wherein the first and second panel sections having established thereon the hazard sign, wherein the hazard sign substantially covers the corresponding panel section surface, wherein the hazard sign comprises numerous diagonal stripes of reflective material, the numerous stripes having an inverse color pattern scheme configured to enhance visibility to the surrounding environment.

9. The cover assembly of claim 8, wherein the hazard sign further comprises text.

10. The cover assembly of claim 9, wherein the hazard sign is painted onto the corresponding panel section surface.

11. A foldable cover assembly for selectively covering a vehicle cargo area within a Sports Utility Vehicle (SUV), the cover assembly comprising:
  first, second, and third rigid substantially rectangular panel sections in a parallel relationship and the second panel section being interposed between the first and third panel sections;
  the first, second, and third panel sections being pivotally connected such that the panel sections can fold in relation to one another so as to form the cover assembly into a configuration having a substantially triangular cross section or the panel sections can fold open to bring the first, second, and third panel sections to have a common plane;
  wherein flexible living hinges connect the adjacent panel sections and each living hinge extends along the entire width of the adjacent panel sections, the living hinges pivot, respectively, in opposite directions;
  a fastening device for temporarily holding the cover assembly in the configuration having the substantially triangular cross section;
  a plurality of rubber nubs releasably fastened to the third panel section via screws, tacks, or bolts, the rubber nubs for placing the cover assembly on pavement when the cover assembly is in the configuration having the substantially triangular cross section;
  wherein the first and second panel sections having imprinted thereon a reflective hazard sign for signaling distress in situations involving motor vehicle traffic, wherein each hazard sign substantially covers the corresponding panel section surface, wherein each hazard sign comprises numerous diagonal stripes, the numerous stripes having an inverse color pattern scheme;
  wherein both hazard signs are directed towards the surrounding environment when the cover assembly is in the configuration having the substantially triangular cross section; and
  wherein the vehicle cargo area is at a location behind a rear seat and between spaced interior sidewalls and under a roof of the SUV.

12. The cover assembly of claim 11, wherein the first and third panel sections comprise a plurality of adapters for releasably connecting to rails or ledges on the interior sidewalls so as to enable the cover assembly to selectively cover the vehicle cargo area, when the first, second, and third panel sections have a common plane, wherein the adapters on the first panel are configured to slide into and interlock with a flange on each rail or ledge and the adapters on the third panel are configured to clip into a notch or indent on each rail or ledge.

13. The cover assembly of claim 11, wherein each hazard sign further comprises text.

14. A method of signaling distress in situations involving motor vehicle traffic, the method comprising:
  retrieving a foldable cover assembly from a vehicle cargo area within a Sports Utility Vehicle (SUV), the foldable cover assembly for selectively covering the vehicle cargo area wherein the vehicle cargo area is at a location behind a rear seat and between spaced interior sidewalls and under a roof of the SUV, the cover assembly comprising:
    first, second, and third substantially rectangular panel sections in a parallel relationship and the second panel section being interposed between the first and third panel sections;
    the first, second, and third panel sections being pivotally connected such that the panel sections can fold in relation to one another so as to form the cover assembly into a configuration having a substantially triangular cross section or the panel sections can fold open to bring the first, second, and third panel sections to have a common plane;
    a fastening device for temporarily holding the cover assembly in the configuration having the substantially triangular cross section;
    wherein at least one of the panel sections having established thereon a hazard sign for signaling distress in situations involving motor vehicle traffic, wherein the hazard sign substantially covers the corresponding at least one panel section surface, wherein the hazard sign comprises numerous diagonal stripes of reflective material, the numerous stripes having an inverse color pattern scheme;
    wherein the hazard sign can be directed towards the surrounding environment when the cover assembly is in the configuration having the substantially triangular cross section; and
    wherein the third panel section comprises a plurality of releasably fastenable rubber nubs for placing the cover assembly on a ground surface, when the cover assembly is in the configuration having the substantially triangular cross section, wherein the rubber nubs are releasably fastened via screws, tacks, or bolts; and
  folding the first, second, and third panel sections in relation to one another so as to form the cover assembly into a configuration having a substantially triangular cross section;
  permitting the cover assembly, when in the configuration having the substantially triangular cross section, to be placed on the ground surface via the rubber nubs at a location visible to motor vehicle traffic; and
  permitting the hazard sign to be directed towards the motor vehicle traffic so as to signal distress.

15. The method of claim 14, further comprising removing the cover assembly from the vehicle interior, when the first, second, and third panel sections have a common plane and the cover assembly selectively covers the vehicle cargo area.

16. The method of claim 14, wherein flexible living hinges connect the adjacent panel sections and each living hinge extends along the entire width of the adjacent panel sections.

17. The method of claim 16, wherein the living hinges pivot, respectively, in opposite directions.

18. The method of claim 14, wherein the first, second, and third panel sections are constructed from a rigid material.

19. The method of claim 14, wherein the first and second panel sections having established thereon the hazard sign.

20. The method of claim 14, wherein the hazard sign further comprises text.

* * * * *